United States Patent [19]
Coleman et al.

[11] Patent Number: 5,938,153
[45] Date of Patent: Aug. 17, 1999

[54] CLONE POPS

[76] Inventors: Thomas J. Coleman, 19170 Paddock Pl., Abingdon, Va. 24211; William K. Schlotter, IV, 117 Wateredge La., Fredericksburg, Va. 22406; Princess Ann Coleman, 19170 Paddock Pl., Abingdon, Va. 24211; Ann M. Schlotter, 117 Wateredge La., Fredericksburg, Va. 22406

[21] Appl. No.: 08/967,607

[22] Filed: Nov. 10, 1997

[51] Int. Cl.⁶ .................................................. F16M 13/00
[52] U.S. Cl. ........................... 248/160; 362/109; 446/188
[58] Field of Search .................. 248/160, 274.1, 248/276.1, 229.25, 515, 514, 915; 446/73, 193, 373, 76, 188; 426/104, 112; 362/109; D6/469, 450

[56] References Cited

U.S. PATENT DOCUMENTS

| | | | |
|---|---|---|---|
| D. 122,659 | 9/1940 | Cox | D1/104 |
| D. 320,300 | 10/1991 | Good et al. | D1/104 |
| D. 353,064 | 12/1994 | Gillbert | D6/469 |
| 976,987 | 11/1910 | Corbridge | 57/83 |
| 1,847,415 | 3/1932 | Snell | 294/5.5 |
| 2,510,198 | 6/1950 | Tesmer | 248/229.25 |
| 2,860,639 | 11/1958 | Hoover | 606/234 |
| 3,085,883 | 4/1963 | Collier | 426/104 |
| 3,615,596 | 10/1971 | Petti | 99/138 |
| 4,271,744 | 6/1981 | Kulesza | 84/330 |
| 5,122,937 | 6/1992 | Stoudemire | 362/109 |
| 5,370,884 | 12/1994 | Coleman | 426/112 |
| 5,471,373 | 11/1995 | Coleman et al. | 362/109 |
| 5,503,857 | 4/1996 | Coleman et al. | 462/110 |
| 5,571,037 | 11/1996 | Sellers | 446/188 |
| 5,615,941 | 4/1997 | Shecter | 362/109 |
| 5,666,693 | 9/1997 | Levay | 16/114 R |
| 5,681,200 | 10/1997 | Shecter | 446/76 |
| 5,733,033 | 3/1998 | Coleman et al. | 362/109 |

*Primary Examiner*—Leslie A. Braun
*Assistant Examiner*—Tan Le
*Attorney, Agent, or Firm*—Melvin L. Crane Agent

[57] ABSTRACT

A clone pop comprising at least one hollow main housing made of a bendable material. Inside the hollow main housing is a plastic bendable sleeve with a bendable wire inside each sleeve. The plastic bendable sleeve and the bendable wire inside the plastic sleeve extends from the lower end of the main housing to the upper end of the main housing. Attached at the upper end of the main housing is a likeness of a head of an animal, character, etc. with an aperture at the top of the head to hold a candy with a candy stick. The main housing can be made in different lengths so a child can bend it to make a bracelet or necklace or to bend two housings together or bend apart in several different shapes. The clone pops can be made and sold separately or as pairs so a child can collect all of a series and make their own combination of clone pops.

5 Claims, 1 Drawing Sheet

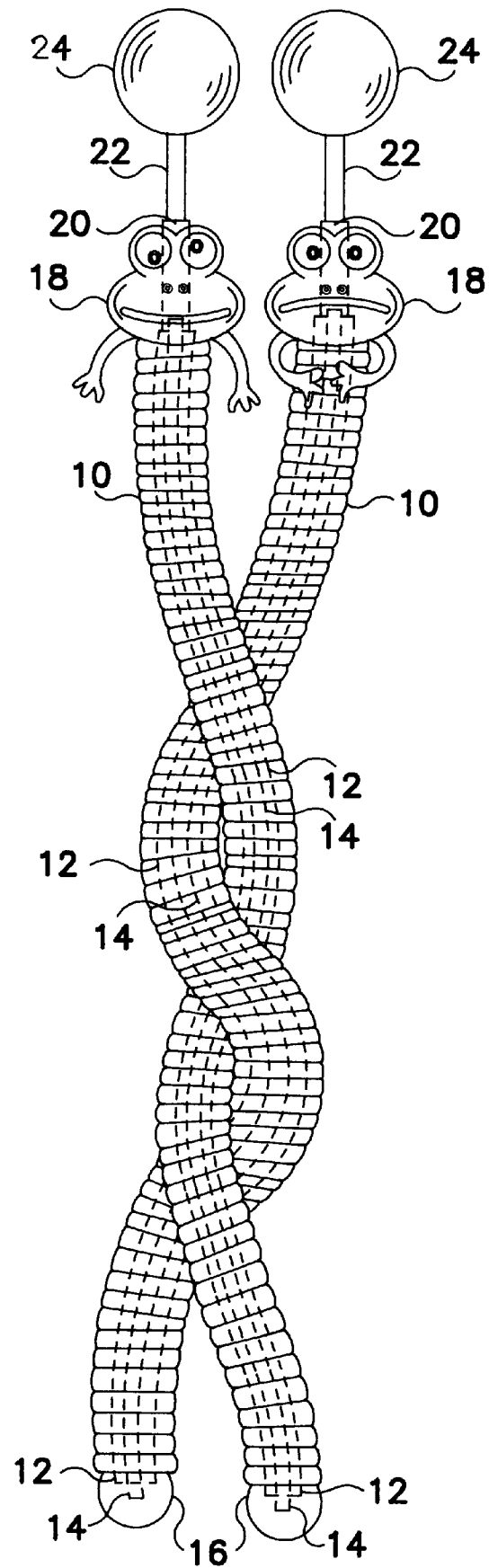

CLONE POPS

This invention is directed to a novelty candy/toy designed to provide a child a combination including a play toy and candy.

Heretofore different devices have been provided by which a person can consume a lollipop while being amused by the device.

U.S. Pat. No. 5,615,941 is directed to a dual lollipop holder which supports a lollipop at opposite ends of the holder. The holders may be spring loaded so that when the lollipop is released from an enclosure, the lollipop will be extended outwardly for consumption. If the lollipop is not completely consumed, the lollipop can be restored within the housing of the holder. The device is also provided with a LED which lights up the user.

It is therefore an object of the invention to provide a novelty lollipop toy which is not only useful for candy consumption but also can be used as a toy of different configurations.

Another object is to provide clone pops which can be configured into one toy of different configuration and which can provide a lollipop for consumption.

Still another object is to provide a toy/pop which is amusing to adults as well as children.

Yet another object is to provide a pair of clone pops which can be easily separated as two different toy/pop devices in which each toy part can be formed into different designs and two people can consume a lollipop of each clone.

Other objects and benefits of the invention will become obvious to those skilled in the art from a review of the description and drawings set forth here.

BRIEF DESCRIPTION OF THE DRAWINGS

The sole drawing illustrates a side view of two clone pops assembled together in one design.

DETAILED DESCRIPTION OF THE CLONE POPS

The drawing illustrates a pair of clone pops assembled by twisting the bodies together. Each clone pop is made of a bendable main housing 10 having a bendable plastic sleeve 12 therein with a central bendable wire 14 along the center. The housing is provided with a closed end 16 which encompasses the plastic sleeve and central wire. The plastic sleeve and central wire extend along the length of the housing to the upper end of the housing which is a likeness of a head of an animal, any funny character, or any other suitable shape 18 which is secured to an outer surface of the housing. The likeness of a head of an animal, etc. is provided with an aperture 20 in the upper surface thereof into which one end of a lollipop stick 22 is inserted in order to secure a lollipop 24 to the likeness of the head.

Since the body is made of a bendable material, two clone pops can be twisted together as shown or in any other possible shape to the enjoyment of a person. The two clone pops could be separated into single clone pops and each clone could be twisted or bent around a wrist or arm as a bracelet, or if made long enough, the clone pop could be bent around one's neck as a necklace.

The clone pops can be made of any suitable diameter and/or length for the satisfaction of the user. Therefore, the purpose of a sale, clone pops could be made of different lengths, diameters, etc. and could be made in a series of different shaped and designed heads so that a person could purchase one each of the series and twist them together and/or make any describable twisted designs. The lollipop will be for consumption no matter what the design. Children could buy different designed clone pops and then swap them for other designs. The lollipop is replaceable; therefore, the lollipops would not be swapped for health reasons.

The housing, head, etc. must be made of smooth material so that one will not become injured from the material. Further, the housing could be made of separate pieces assembled together so that one piece will be rotatable or bent relative to an adjacent piece. Also, the housing could be made of bendable plastic so that the housing could be bent into different shapes. Of course, the housing could be painted or colored in different colors of rings, stripes, zigzags, or any suitable color scheme without departing from the concept of the invention.

The foregoing relates to preferred exemplary embodiments of the invention, it being understood that other variants and embodiments thereof are possible within the spirit and scope of the invention, the latter being defined by the appended claims.

We claim:

1. A clone pop, said clone pop including an elongated bendable housing, a bendable wire along a center of a length of said bendable housing, a bendable plastic sleeve along a length of said housing between an inner surface of said housing and an outer surface of said bendable wire, whereby said wire and said bendable plastic sleeve will bend along with said housing, and a likeness of a character secured onto one end of said elongated bendable housing.

2. A clone pop as set forth in claim 1, in which said clone pop is of a length of a bracelet or necklace and bendable to form the same.

3. A clone pop as set forth in claim 2, which includes two clone pops twisted together to form a pair of clone pops.

4. A clone pop as set forth in claim 1, in which said likeness of a character secured onto said one end of said elongated housing includes an aperture therein for receiving a stick of a lollipop.

5. A clone pop as set forth in claim 4, which includes two clone pops twisted together to form a pair of clone pops.

* * * * *